United States Patent [19]

Chambers

[11] 3,996,507

[45] Dec. 7, 1976

[54] REGULATOR FOR CONTROLLING SYNCHRONOUS DYNAMOELECTRIC MACHINES

[75] Inventor: George S. Chambers, Waynesboro, Va.

[73] Assignee: General Electric Company, Salem, Va.

[22] Filed: Aug. 27, 1975

[21] Appl. No.: 608,282

[52] U.S. Cl. .................................. 322/20; 322/24; 322/28; 322/59

[51] Int. Cl.² ........................................ H02P 9/14

[58] Field of Search .................. 320/17, 19, 20, 22, 320/24, 25, 59; 322/27, 28

[56] References Cited

UNITED STATES PATENTS

| | | | |
|---|---|---|---|
| 2,478,623 | 8/1949 | Crary et al. | 322/20 |
| 3,634,750 | 1/1972 | Bobo | 322/20 |
| 3,656,048 | 4/1972 | Hauf | 322/19 |

OTHER PUBLICATIONS

Rubenstein & Tenoshok "Underexcited Reactive Ampere Limit for Modern Amplidyne Voltage Regulator" Paper 54-504, Approved AIEE Fall General Meeting, Chicago, Ill., June 15, 1954.

*Primary Examiner*—Robert J. Hickey
*Attorney, Agent, or Firm*—Robert E. Brunson; Arnold E. Renner; Philip L. Schlamp

[57] ABSTRACT

In a power system, control signals derived from a measurement of dynamoelectric machine output voltage and current are selectively applied to an exciter to control the current in a field winding of the machine to control the machine reactive volt-amperes and output voltage.

8 Claims, 1 Drawing Figure

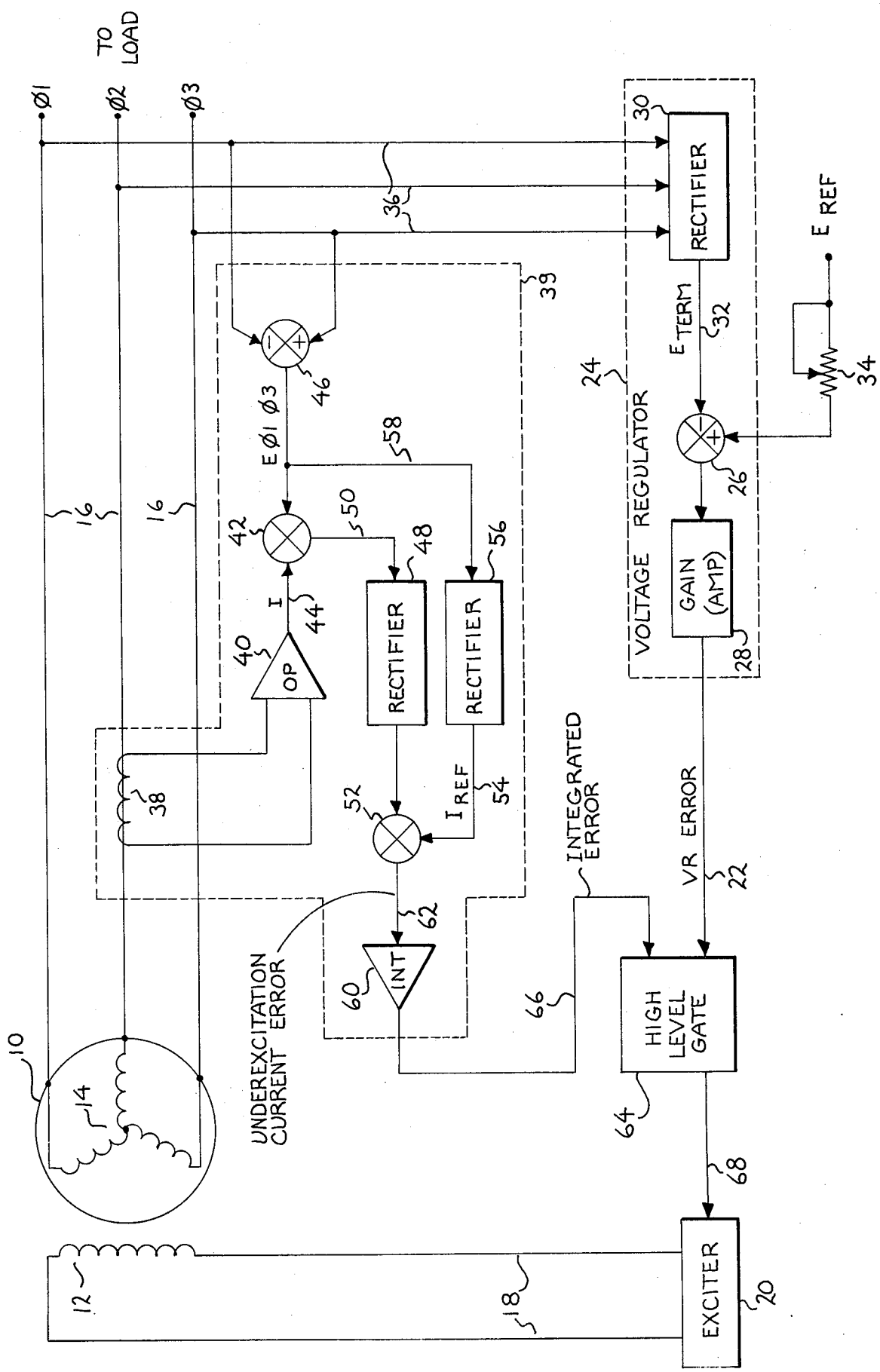

REGULATOR FOR CONTROLLING SYNCHRONOUS DYNAMOELECTRIC MACHINES

BACKGROUND OF THE INVENTION

1. Field of the Invention

This invention relates generally to regulator systems for dynamoelectric machines and more particularly to apparatus for controlling the reactive volt-amperes in synchronous alternating current (a.c.) generators by controlling the excitation current in the field winding of the generators in such systems.

2. Description of the Prior Art

Reactive volt-ampere limiting has been applied to power systems since the early application of voltage regulators to synchronous dynamoelectric machines, such as, steam turbine generators, hydro-generators, and synchronous condensers.

Today, practically all regulators for dynamoelectric power systems are supplied with an underexcited reactive ampere limit. The purpose of the underexcited reactive ampere limit in the system is to prevent the a.c. machine from exceeding its steady-state stability limit (loss of synchronism with other machines in the power system due to system disturbances).

Most all power systems presently making use of the underexcited reactive ampere limit have circuits which utilize the a.c. machine terminal voltage and current for determining stability limit characteristics.

Two known prior art systems are documented in U.S. Pat. No. 2,478,623, entitled "Regulator For Synchronous Dynamoelectric Machines", issued to Selden B. Crary and Melville E. Hartman and assigned to the assignee of the present invention, and a paper entitled "Underexcited Reactive Ampere Limit For Modern Amplidyne Voltage Regulator", by A. S. Rubenstein and M. Temoshok, identified as paper 54-504 approved by the AIEE Committee on Technical Operations presented at the AIEE Fall General Meeting, Chicago, Illinois, Oct. 11-15, 1954.

Each of these references discloses, in one form or another, an underexcited reactive ampere limit circuit which obtains its inputs from the a.c. machine terminals (voltage and current). The function of the limit circuit is to detect an increase in the underexcited reactive current in the a.c. machine beyond a preset value, and to provide a signal to a voltage regulator or power supply means which acts to limit the increase in underexcited reactive current. This underexcited reactive ampere limit serves to prevent reduction of the a.c. machine field winding excitation current below a preset point. An increase in the underexcited reactive current, beyond a preset value, effectively causes the underexcited reactive ampere limit to readjust the voltage regulator or power supply means supplying current to the a.c. machine field winding to hold a higher machine voltage. In generators, the allowable maximum underexcited reactive current is generally varied as a function of the power output of the generator. The amount by which the excitation current is raised is proportional to the increase in the generator reactive volt-amperes.

While the prior art systems have served to substantially control the underexcited reactive current limit, they have performed that control by the establishment of limits in which the underexcited reactive limit can operate. That is, the limiting action (limit start point) starts when the underexcited reactive current reaches a preset value and acts to keep the reactive current within a range of values between the start point and a maximum value of underexcitation current.

While this operating in a range of values serves to effectively prevent the a.c. machine field excitation current from being lowered beyond that value required for machine stability to prevent pullout or loss of synchronism, it does not allow a high precise control of the reactive ampere limit which enhances overall machine performance under all operating conditions.

It is, therefore, desirable to provide an improved regulator for controlling dynamoelectric machines which accurately controls the value of the machine reactive current without the need of an established "start point" to control the underexcited reactive current limit.

SUMMARY OF THE INVENTION

The present invention substantially overcomes those limiting range problems of the prior art by the provision of an improved apparatus in a power system which more precisely controls the field winding excitation current, or underexcited reactive ampere limit, of an a.c. generator to prevent excessive underexcitation of the field winding.

In accordance with the invention, it has been found advantageous to supplement the action of the conventional voltage regulator with a separate sensing means or reactive ampere measuring circuit in conjunction with a selector which is selectively responsive to the values of the generator output voltage and reactive current to prevent generator field excitation from being reduced to a value where instability and loss of synchronism of the generator and the interconnected system results.

In the present invention, generator output voltage and current are sensed by correspondingly responsive circuit elements which develop first and second error signals, each for use solely in controlling the generator field winding excitation current. The error signals are provided to selecting means which selects the error signals in accordance with their magnitudes to provide an underexcited reactive ampere control signal to an exciter which precisely controls the value of the field winding excitation current.

The error signal or voltage having the greater magnitude controls the level of excitation current generated by the exciter. When the generator output voltage is at the prescribed value, exciter generated excitation current is controlled by the first error signal. A system disturbance, such as temporary loss of system load, can cause an increase in the output voltage and the generator underexcited reactive volt-amperes. Such an increase can effect the selection of the second error signal which prevents excessive under-excitation of the field winding by bringing into effect precise control exhibited by the underexcited reactive ampere limit. This precise control in the present invention continuously increases the field winding excitation current, to prevent instability, so long as there is an error between the actual generator reactive volt-amperes and the desired reactive volt-amperes. When the error is zero, excitation current and the reactive volt-amperes are at their prescribed values.

It is, therefore, an object of the present invention to provide a power system having enhanced capabilities for controlling the excitation current of a dynamoelectric machine.

Another object is to provide apparatus for precisely controlling the level of excitation current in the field winding of an a.c. generator to prevent excessive underexcitation of the winding when the generator output voltage or reactive current exceeds a prescribed value.

Yet another object is to provide apparatus for selectively controlling the level of excitation current in the field winding of an a.c. generator and the reactive current thereof at prescribed values in accordance with detected levels of the generator output voltage and current.

A still further object is to provide a.c. generator field excitation apparatus which eliminates a.c. generator instability and overheating by the sensing and control of the underexcited reactive amperes of the generator.

BRIEF DESCRIPTION OF THE DRAWING

Further objects, advantages and features of the invention can be better understood from a detailed description of the single drawing illustrating in detailed block diagram form a power system in accordance with the present invention.

DESCRIPTION OF THE PREFERRED EMBODIMENT

Reference is now made to the drawing where there is shown a static generator excitation power system comprising a three phase synchronous generator 10 having a conventional rotating field winding 12 and armature windings 14 connected to supply alternating current energy to an external load or power system (not shown) through a plurality of line conductors 16. The synchronous generator 10 is adapted to be driven at a comparatively constant speed by any suitable form of prime mover (not shown). Excitation or energizing current for the generator field winding 12 is supplied from output conductors 18 of a conventional exciter 20 of the reactance or solid state type.

A voltage error signal (VR ERROR) is supplied as a control input to the exciter 20 via a high level gate 64 and conductors 22 and 68. The value of the VR ERROR signal controls the exciter to supply excitation current proportional to the magnitude of the VR ERROR signal to the winding 12.

The VR ERROR signal is generated by a voltage regulator generally designated in dashed lines as 24. Regulator 24 includes a summer 26, such as an operational amplifier, a gain or amplifier 28 for providing the amplified VR ERROR signal to the exciter 20 and a conventional rectifier 30. The VR ERROR signal has a value proportional to the algebraic sum of an ETERM signal proportional to the generator terminal voltage and a reference signal (EREF) proportional to a desired generator output voltage.

The ETERM signal is provided to a negative (−) input terminal of the summer 26 from rectifier 30 via a conductor 32 and the reference signal is provided to a positive (+) input terminal of the summer 26 from a reference potential EREF (not shown). EREF is adjustable by a slider or potentiometer 34 to adjust the reference signal to achieve the desired generator output voltage. Rectifier 30 is connected to the output conductors 16 via conductors 36, and thus rectifies the generator output ($\phi1$, $\phi2$, $\phi3$) to generate the ETERM signal.

In the operation of the invention, it is customary to adjust slider 34 to provide a sufficient field excitation current in winding 12 to hold a desired voltage at the output terminals of synchronous generator 10.

The circumstances which affect the stability of the generator output voltage in a power system, such as varying system and load conditions, are well known in the art. For that reason, the mechanics of these circumstances will not be explained herein. Let it suffice, for various reasons, that the generator stability is affected by disturbances which are finite and aperiodic and which cause the output voltage to fluctuate above and below the prescribed or normal voltage value.

Still referring to the drawing, when the output voltage begins to drop below its normal value, the summer 26 detects a greater difference between the ETERM signal and the reference signal (EREF). Thus, the level of the VR ERROR signal increases. Assuming that the VR ERROR signal is passed directly through gate 64, the exciter 20 will be caused to supply more excitation current to winding 12. This increase in excitation current has the effect of normalizing the generator output voltage by increasing the excitation current.

In contrast to a decrease in the generator output voltage, an increase, as detected by summer 26, causes the excitation current to be decreased in winding 12. This has the effect of reducing or lowering the output voltage back to normal. In the portion of the drawing just described, if the generator output voltage continues to increase, the level of the VR ERROR signal will correspondingly cause a decrease in the field winding current (uncontrolled reactive ampere limit) until the winding is excessively underexcited. It is this excessive underexcitation which causes generator instability and potential generator overheating.

The present invention overcomes these problems of instability and overheating by controlling the underexcited reactive ampere limit through a precise limiting of a decrease in the field winding excitation current when system disturbances cause increases in the generator output voltage or underexcited reactive volt-amperes.

The generator underexcited reaction current is measured by a circuit sensing means 39 shown in dashed lines. Sensing means 39 senses the reactive generator current on conductor 16 ($\phi2$) by a current transformer 38 connected to the input of an operational amplifier 40. Amplifier 40 provides an a.c. signal I proportional to the generator output current to a summer 42 via a conductor 44. The summer 42 also receives an input signal $E\phi1\phi3$ from another summer 46. The $E\phi1\phi3$ signal is an a.c. signal having a value proportional to the algebraic sum of the $\phi1$ and $\phi3$ voltage or signal values.

The summer 42 provides a signal having a value proportional to the algebraic sum of input signals (I and $E\phi1\phi3$) to a conventional rectifier 48 via a conductor 50.

The output of rectifier 48 is connected to a summer 52. A second input to summer 52 is an IREF signal on conductor 54 from a conventional rectifier 56. The IREF signal serves as a current reference and is derived from a rectification of the $E\phi1\phi3$ signal on a conductor 58 from the summer 46.

Summer 52 provides an error signal to a conventional integrator 60 via a conductor 62. This error signal always has a value proportional to the algebraic sum of the actual reactive current and the desired reactive current limit. This error signal on conductor 62 is shown as an underexcitation current error, and is used to ultimately control the exciter to control the underexcited reactive current.

The integrator 60 provides the integrated underexcitation current error signal to one input of the high level gate circuit 64 via a conductor 66. This integrated error signal, when utilized to control the field winding excitation current, functions to cause the underexcited reactive ampere limit to effectively readjust the exciter output current on conductors 18 to hold the generator terminal voltage stable. It is apparent from the preceding discussion that circuit 39 automatically and variably controls the allowable maximum underexcited reactive current as a function of the power output of the generator.

A second input to the high level gate 64 is the VR ERROR signal on conductor 22 as previously described. Gate 64 is designated as a high level gate since that nomenclature describes its functional purpose. A control signal from gate 64 is provided to the exciter 20 on a conductor 68. This control signal has a value proportional to put input signal of greater magnitude applied to gate 64 (i.e., gate 64 always selects the higher of its two input signals on conductors 22 and 66). There are several types of circuits which can serve the function of gate 64. One such circuit, known as a "precision maximum selector" is documented at page 251, Fig. 7.18 in the book entitled "Operational Amplifiers", published by the McGraw Hill Book Company, Copyright 1971, by Burr-Brown Research Corporation.

In describing the operation of the invention, two assumed system operating conditions will be described; (1) when the generator reactive volt-amperes are at the prescribed value, and (2) when a disturbance causes the generator reactive volt-amperes to exceed that prescribed value.

Considering the first condition (1), it is first advantageous to point out that the value of the VR ERROR signal on conductor 22 always exceeds the value of the integrated error signal on conductor 66 when the output voltage and generator reactive current are at their normal prescribed values. As a result, the high level gate will pass the VR ERROR signal to the exciter 20, which responds by providing the proper excitation current to winding 12 to keep the generator output voltage constant. In the sense, the operation of the invention is the same as the prior art, except for gate 64.

Prior to giving consideration to the second (2) condition, it is considered advantageous to briefly describe the overall operational characteristics of the reactive ampere limiting circuit 39 and its relationship with the overall system.

There is not shown in the circuit 39 of the drawing means for adjusting the various signal levels from the several summers (42, 46 and 52) and the rectifiers (48 and 56). These adjusting means are not shown because they could be included any place in the circuit deemed appropriate by a design engineer. Further, the circuit could be designed with suitably chosen lumped components requiring no adjustment.

When the system is operating, and if an error occurs in summer 52, the integrated error signal will increase with time to maintain or return the underexcited reactive current to the established desired value. The error is removed when the actual and desired reactive current is equal as detected by summer 52.

Consideration will now be given to the operation of the invention under the second (2) condition. Let it now be assumed that a disturbance causes the generator output voltage to exceed the prescribed value by an amount which causes the value of the VR ERROR signal to drop to a point so low that the winding 12 can become excessively underexcited causing generator instability and the possible loss of generator synchronism. The VR ERROR signal will decrease as the generator output voltage instantaneously increases because of the smaller difference between the reference signal (EREF) and the terminal voltage (ETERM) applied to summer 26. While the VR ERROR signal decreases in value, the value of the integrated error signal on conductor 66 increases. These increases in the generator underexcited reactive current and voltage effect corresponding changes in the respective signals applied to summers 42, 46 and 52 causing an increase in the integrated error signal, thus resulting in a detection of an increase in the generator reactive volt-amperes.

When the value of the integrated error signal on conductor 66 exceeds the value of the VR ERROR signal on conductor 22, the high level gate 64 selects the integrated error signal and passes that signal to the exciter 20 via conductor 68. The exciter is now controlled by a control signal having a value proportional to the integrated error signal. The exciter now provides the proper excitation current to the generator field winding which immediately acts to maintain or return the underexcited reactive current to the prescribed normal value.

When the generator reactive current becomes less than the prescribed value, the selector gate 64 will again select the higher error signal (VR ERROR) and the system will return to operate as described for the first condition (1).

The present invention does not totally pertain to safety devices for shutting the power system down in the event of an unsafe power condition. As such, it is to be understood that systems of the type disclosed herein normally include circuit breakers or saturable reactor type transformers for sensing either field excitation current or output current to remove the field winding excitation current should the output voltage reach levels which could catastrophically damage the system. Thus, it can be seen that the present invention is intended to contribute to the stability and protection of the generator below those output power levels of a noncatastrophic nature.

Although the invention has been described herein in connection with a three-phase generator, it will be apparent to anyone of ordinary skill in the art to which the invention pertains that the invention is also applicable to generators having other than three phase output.

While the principles of the invention have now been made clear in an illustrative embodiment, it will be understood from the foregoing by those skilled in the art that there are many modifications of structure, arrangement, the elements, materials and components used in the practice of the invention and otherwise, which are particularly adapted for specific environments and operating requirements without departing from those principles. The appended claims are, therefore, intended to cover and embrace any such modifications within the limits of the true spirit and scope of the invention.

What is claimed is:

1. An improved regulating system for controlling the output voltage of a synchronous alternating current dynamoelectric machine having a field winding comprising:
   a. exciter means for providing a controllable excitation current to said field winding;

b. regulator means responsive to the output voltage of said dynamoelectric machine for generating a first signal for use in controlling the field winding excitation current to maintain the output voltage of said dynamoelectric machine at a specific value;

c. sensing means responsive to the reactive current in said dynamoelectric machine for generating a second signal having a value proportional to the difference in the values of the machine reactive current and a desired reactive current limit derived from the output voltage, said second signal serving to control the field winding excitation current to maintain the output voltage at said specified value when the machine reactive current exceeds a predetermined value defined by said desired reactive current limit; and, d. selecting means responsive to said first and second signals for selectively providing a control signal to said exciter means proportional to the value of the one of said first and second signals of greater magnitude to thereby control the magnitude of the excitation current provided to said field winding by said exciter means.

2. The regulating system in accordance with claim 1 wherein said regulator means includes means for rectifying the dynamoelectric machine output voltage, a signal source for providing a reference signal having a value representative of the output voltage specified value and means to algebraically combine the reference signal and the rectified output voltage for generating said first signal.

3. The regulating system in accordance with claim 1 wherein said sensing means includes means for algebraically combining the output voltage and current for measuring the difference in the values of the desired and machine reactive currents and integrator means coupled to said means for algebraically combining for generating said second signal whereby said second signal has a value specified by the time integration of the measured difference in the actual and desired reactive currents.

4. An improved regulating system for controlling the terminal voltage of a synchronous alternating current generator having a field winding comprising:

a. an exciter for providing controllable excitation current to said field winding;

b. means for generating a reference signal proportional to a desired generator terminal voltage;

c. regulator means responsive to the generator terminal voltage and the reference signal for generating a first signal having a value proportional to the algebraic sum of the magnitudes of the terminal voltage and the reference signal, said first signal for use in controlling the field winding excitation current to maintain the desired generator terminal voltage;

d. sensing means responsive to the generator terminal voltage and current including a first means for generating a second signal proportional to a measurement of reactive current in said generator, a second means responsive to the terminal voltage for generating a reference signal representative of a desired reactive current and third means responsive to said second signal and said reference signal for generating a third signal for use in controlling the field winding excitation current to maintain the desired generator terminal voltage when the generator reactive current exceeds said desired reactive current; and, e. a high level detector receiving said first and third signals, said detector providing a control signal to said exciter having a value proportional to the value of the one of said first and third signals of greater magnitude to thereby control the magnitude of the excitation current provided to said field winding by said exciter.

5. A regulating system for controlling the output voltage of a synchronous alternating current generator having a field winding comprising:

a. an exciter for providing controllable excitation current to said field winding;

b. regulator means responsive to the output voltage of said generator for generating a regulator signal for use solely in controlling the field winding excitation current to maintain the generator output voltage at a specified value;

c. sensing means responsive to the generator output voltage and current for measuring the value of reactive current in said generator, including means for generating an integrated error signal having a value proportional to the time integration of the excess in the value of the generator reactive current beyond a specified value, said integrated error signal for use solely in controlling the field winding excitation current to maintain the reactive current at the specified value; and, d. a high level detector receiving said regulator signal and said integrated error signal, said detector providing a control signal to said exciter having a value proportional to the value of the one of said regulator and integrated error signals of greater magnitude to thereby control the value of the generator reactive current in accordance with the magnitude of the excitation current provided to said field winding by said exciter.

6. In a power regulating system of the type including a synchronous alternating current generator having a field winding receiving controllable excitation current from an exciter controlled by a regulator signal derived from a voltage regulator sensing the output voltage of the generator, an improved apparatus for controlling the reactive current and output voltage of the generator comprising:

a. means responsive to the generator output voltage and current for measuring the value of reactive current in said generator, including means for generating an integrated error signal having a value proportional to the time integration of the excess in the value of the generator reactive current beyond a specified value, said integrated error signal for use solely in controlling the field winding excitation current to maintain the reactive current at the specified value; and, b. a high level detector receiving said integrated error signal and the regulator signal, said detector providing a control signal to said exciter having a value proportional to the value of the one of said regulator and integrated error signals of greater magnitude to thereby govern the magnitude of the excitation current provided to said field winding by said exciter to control the generator output voltage and reactive current.

7. An automatic regulating system for controlling the output of a synchronous alternating current generator having an armature and a field winding, in accordance with the values of the generator output voltage and reactive current comprising:

a. an exciter for providing a controllable excitation current to said field winding;
b. regulator means responsive to the output voltage of said generator for generating a first signal for use solely in controlling the field winding excitation current at a prescribed value to maintain the generator output voltage constant,
c. sensing means coupled to the output of said generator and responsive to the reactive current in said armature for generating a second signal having a value porportional to the difference in the values of the armature reactive current and a desired reactive current limit derived from the output voltage, said second signal serving to control the field winding excitation current at the prescribed value when the armature reactive current exceeds a predetermined value defined by said desired reactive current limit to prevent said generator from pulling out of synchronism; and,
d. a high level signal selector circuit receiving said first and second signals, said selector circuit providing a control signal to said exciter having a value proportional to the value of the one of said first and second signals of greater magnitude to thereby control the magnitude of the excitation current provided by said exciter to said field winding at the prescribed value.

8. An improved regulating system for controlling the output voltage of a synchronous alternating current dynamoelectric machine having a field winding comprising:
a. exciter means for providing a controllable excitation current to said field winding;
b. regulator means responsive to the output voltage of said dynamoelectric machine for generating a first signal for use in controlling the field winding excitation current to maintain the output voltage of said dynamoelectric machine at a specified value;
c. sensing means including,
   1. means for algebraically combining the machine output voltage and current for measuring the difference in the values of the actual machine reactive current and a desired reactive current, and
   2. integrator means coupled to said means for algebraically combining for generating a second signal having a value specified by the time integration of the measured difference in the actual and desired reactive currents; and,
d. selecting means responsive to said first and second signals for selectively providing a control signal to said exciter means proportional to the value of the one of said first and second signals of greater magnitude to thereby control the magnitude of the excitation current provided to said field winding by said exciter means.

* * * * *